United States Patent [19]

Mollere

[11] 4,132,974
[45] Jan. 2, 1979

[54] METHOD FOR SEISMIC MARINE SURVEY
[75] Inventor: John C. Mollere, Nassay Bay, Tex.
[73] Assignee: Hercules Incorporated, Wilmington, Del.
[21] Appl. No.: 814,517
[22] Filed: Jul. 11, 1977

Related U.S. Application Data

[60] Division of Ser. No. 354,269, Apr. 25, 1973, Pat. No. 4,059,819, and a continuation-in-part of Ser. No. 115,360, Feb. 16, 1971, abandoned.

[51] Int. Cl.$^2$ ............................................. G01V 1/38
[52] U.S. Cl. ................................ 340/7 R; 340/8 LF; 340/10
[58] Field of Search .................. 340/7 R, 7 PC, 8 LF, 340/10; 181/106, 110, 112, 116, 118, 402

[56] References Cited
U.S. PATENT DOCUMENTS

| | | | |
|---|---|---|---|
| 1,470,733 | 10/1923 | Hayes | 340/8 LF |
| 2,465,696 | 3/1949 | Paslay | 340/8 LF |
| 2,613,261 | 10/1952 | Massa | 340/8 LF |
| 3,178,681 | 4/1965 | Horsman et al. | 340/8 LF |
| 3,328,752 | 6/1967 | Sims | 340/10 |
| 3,509,959 | 5/1970 | Fitch et al. | 181/116 |
| 3,592,286 | 7/1971 | Johnson | 340/7 R |

*Primary Examiner*—Nelson Moskowitz
*Attorney, Agent, or Firm*—Michael P. Breston

[57] ABSTRACT

A method for seismic prospecting in a body of water which comprises trailing a gun adapted to initiate explosively-operated charges at a sufficient depth below the water's surface to allow the creation in the body of water of high-pressure waves, and detecting the pressure waves with a detector assembly including a housing having a flexible, sound-transmitting wall defining a chamber, an incompressible liquid completely filling the chamber, and a detector probe completely immersed in the incompressible liquid.

2 Claims, 5 Drawing Figures

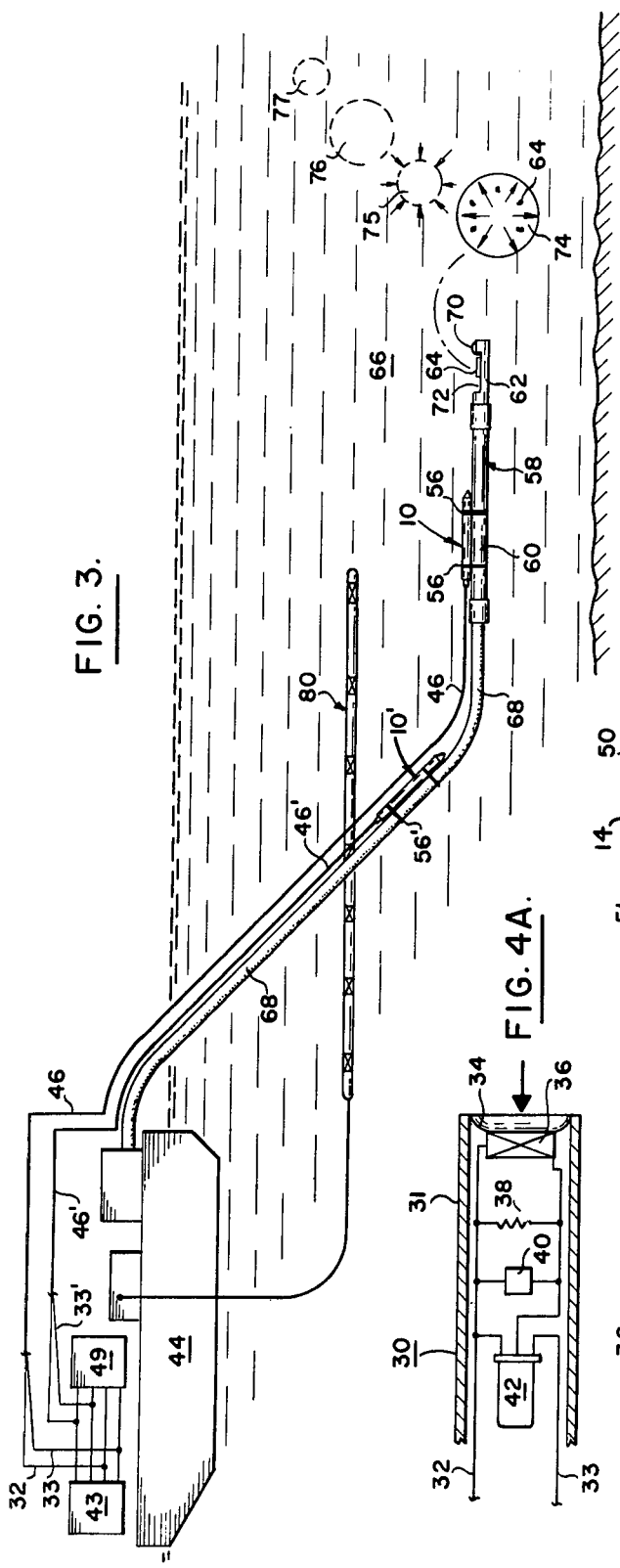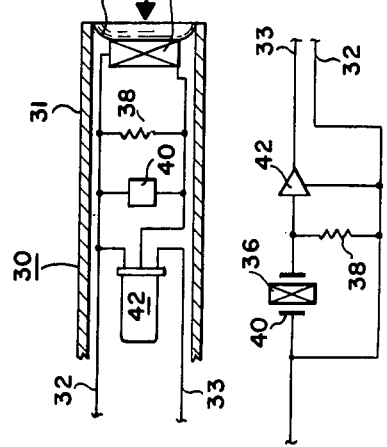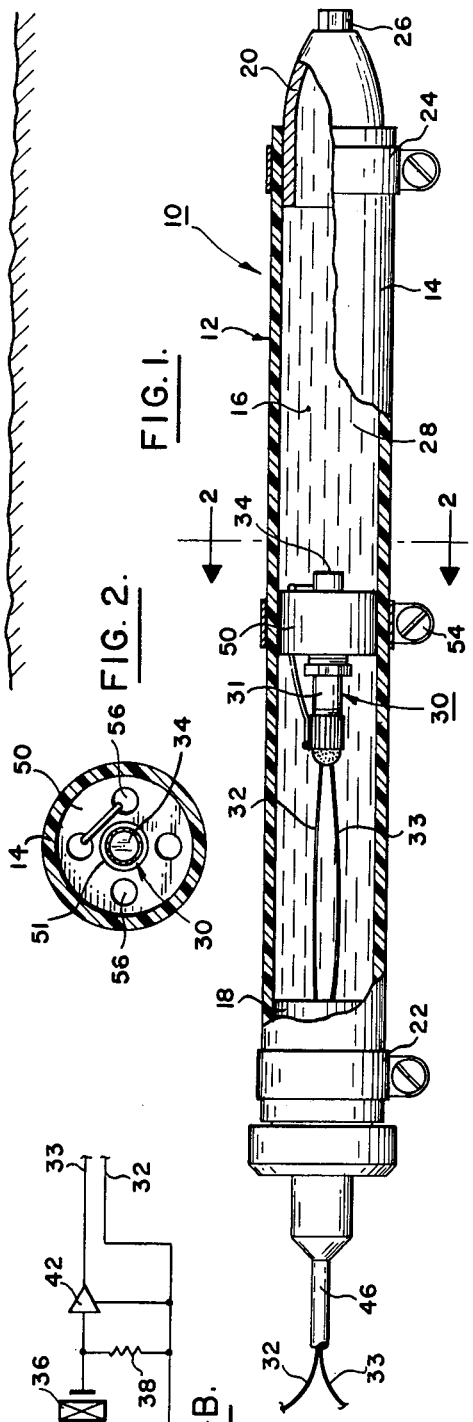

METHOD FOR SEISMIC MARINE SURVEY

REFERENCE TO RELATED APPLICATIONS

This is a division of application Ser. No. 354,269 filed Apr. 25, 1973 now U.S. Pat. No. 4,059,819, issued Nov. 22, 1977 and a continuation-in-part of my copending application Ser. No. 115,360, Feb. 16, 1976, and now abandoned. An underwater gun which initiates the explosions detected by the method of this invention is described in my copending application Ser. No. 354,269, now U.S. Pat. No. 4,059,819, assigned to the same assignee.

BACKGROUND OF THE INVENTION

U.S. Pat. No. 3,592,286 describes a marine seismic survey system, known as the MAXIPULSE SYSTEM ®, which is based on the recognition that a useful seismic marine survey can be obtained with small explosives by correcting for or beneficially employing "bubble" pressure pulses. This is accomplished by obtaining a representation of the unreflected pressure waves in the body of water, created by the explosions of the small explosive charges, simultaneously with the conventional detection of the reflected acoustic waves, and suitably using both of the detected waves.

Upon detonation of each charge, the chemical energy in the charge is suddenly converted into kinetic energy of a rapidly expanding mass contained in a bubble. Because the gas bubble is normally generated at a depth of say 30 to 50 feet, it cannot vent directly to the atmosphere. This gas bubble therefore undergoes a very fast initial expansion which causes the surrounding water to become suddenly strongly compressed. Subsequent to the initial expansion, the bubble contracts then again expands then again contracts, etc. The entire sequence of such gas bubble expansions and contractions forms a high-pressure wave in the body of water which produces reflected, seismic, very-low pressure acoustic waves.

The marine seismic survey described in said U.S. Pat. No. 3,592,286 is predicated upon the ability to faithfully and substantially-linearly detect the unreflected, high-pressure wave created by each explosion.

Conventional detectors generally employed in the seismic industry cannot withstand such high-pressure waves which are like shock waves. The known seismic detectors comprise a fragile detector which converts acoustic energy into electric energy. More specifically, the detector produces a high-impedance charge or voltage when subjected to pressure. Thus, the detector acts as a pressure-to-voltage converter.

Since in a MAXIPULSE SYSTEM the detector need be positioned a distance of about 200 to 300 feet from the recording equipment, any resistance variations in the long line coupling the detector to the recording equipment may cause significant variations in the current impressed on the line by the high-impedance voltage from the detector. Accordingly, conventional seismic detectors would fail under the impact of the generated shock waves in the body of water, and their usefulness would be greatly reduced by the fact that such detectors act as high-impedance, voltage generators.

In sum, the detectors or hydrophones normally used in the seismic industry are required to detect very-low pressure acoustic waves, whereas the instantaneous shock wave resulting from an explosion may exceed 10,000 psi. There is therefore a need for a linear shock wave detector adapted for use in a MAXIPULSE SYSTEM in order to faithfully reproduce the high-pressure wave resulting from explosions of small seismic explosive charges.

A high-pressure detector probe is manufactured and sold by the PCB Piezotronics Corporation of Buffalo, N.Y. under several models, although the model of particular interest herein is Model 113A22. The detector probe is contained in an elongated metal casing housing a quartz crystal detector coupled to an amplifier which must be continuously energized. The detector probe is designed to be installed in the wall of a vessel the inside volume of which undergoes high-pressure fluidic variations. The end of the cylindrical probe which contains the input terminals to the probe is not exposed to and is protected from the shock waves, and only the other end of the cylindrical probe containing the quartz crystal is exposed to and communicates with the inside of the vessel.

By mounting the proble so that only the crystal side faces or is in direct fluid communication with the sea water, it was found that the probe's metal housing, which constitutes one terminal for the two-wire input, picks up electric noise signals from the sea water which are on the order of magnitude of the desired signals to be detected.

After considerable experimentation, I have found that by fully immersing the probe inside a dielectric fluid housed in a container having a flexible wall, not only does the probe not become damaged (as was generally believed that it would) but the metal housing of the probe becomes electrically isolated from the electric noise currents normally existing in the sea water and resulting from man-made objects and from natural phenomena. The container with the probe inside thereof will be hereinafter referred to as the detector assembly.

The location of the detector assembly on the gun relative to the charge launcher portion is governed by the ability of the probe to withstand the large shock waves generated in the ambient water by the explosions following the detonations of the charges and the ability of the probe to reproduce faithfully the pressure waveforms resulting from such explosions.

It is preferred to employ two such detector assemblies displaced from each other, so that in the event of a premature detonation which would take place too close to the first detector assembly, thereby affecting its output linearity, the output from the second detector assembly would provide a faithful reproduction of the pressure shock wave.

SUMMARY OF THE INVENTION

A seismic method and apparatus for generating shock waves resulting from the explosion of small seismic charges in a body of water by employing a detector assembly which faithfully and accurately converts the impinging shock waves into corresponding trains of current pulses. The detector assembly has a housing made of a flexible material and defining a chamber filled with an incompressible, dielectric liquid. Completely immersed in the dielectric liquid is a detector probe which includes a quartz crystal and an amplifier for converting the high-impedance charges or voltages produced by the crystal, in response to the unreflected shock waves, into corresponding low-impedance currents. The probe is energized through a pair of long wires leading from a seismic vessel which tows the gun that creates the explosions. The generated currents by the probe are transmitted to recording equipment on board the vessel via the same pair of wires that energize the probe. The recorded current pulses are subsequently used in the processing of the detected reflected seismic waves resulting from the detonation of the charges in the body of water.

BRIEF DESCRIPTION OF THE DRAWINGS

FIG. 1 is a perspective view partly in section of the detector assembly of this invention;

FIG. 2 is a view on line 2—2 in FIG. 1;

FIG. 3 is a schematic representation of a seismic survey system employing an underwater gun for detonating small seismic charges and on which is mounted the detector assembly of this invention;

FIG. 4A is an internal schematic representation of the probe detector; and

FIG. 4B is a circuit diagram of the probe detector.

The detector assembly of this invention is generally designated as 10. It includes a housing 12 having a wall 14 made from a flexible material and preferably having an elongated cylindrical configuration, as shown. The inside volume of cylindrical housing 12 defines a chamber 16 which is confined between the inner surface of wall 14 and two end caps 18 and 20. Wall 14 is clamped tightly to end caps 18 and 20 by suitable clamps 22 and 24, respectively. Cap 20 preferably has a conical configuration and includes a fill plug 26 through which an incompressible, dielectric liquid 28 can be poured into and out of chamber 16. A suitable such liquid is kerosene known in the seismic art as "cable fluid."

Mounted inside chamber 16 and completely immersed in the liquid 28 is a detector probe, generally designated as 30, which is commercially available from said PCB Piezotronics, Inc., especially Model No. 113A22. The probe has an elongated, cylindrical, stainless steel housing 31 (FIG. 4A) which grounds one of the pair of wires 32, 33 connected to the input terminals of the probe. Housing 31 may have a length of 1.2 inches and a diameter slightly less than a ¼ inch.

As shown in FIGS. 4A and 4B, inside housing 31 and near its end wall 34 is a quartz crystal 36 mounted to be responsive to the applied pressure in the direction of the arrow. Inside housing 31 are also: an input resistor 38 and a ranging capacitor 40, both connected across the input terminals of an integrated-circuit (I-C) amplifier 42 whose output circuit is connected to wires 32, 33.

Quartz crystals, because of their extreme ruggedness and high-frequency response, are well suited for the measurement of shock waves. The employed quartz crystal 36 preferably operates in a thickness compression mode and generates an electric charge whenever deflected by the applied pressure. This charge creates a voltage across capacitor 40 which is fed to the gate of amplifier 42. While this voltage has a high impedance, the output circuit of amplifier 42 has a very-low impedance (less than 100 ohms) so that essentially the output circuit of the amplifier appears as a current source rather than as a voltage source.

The amplifier operates best when energized by a substantially-constant current source 43 on the deck of a seismic vessel 44. Source 43 is connected to the remote ends of the pair of wires 32, 33 (FIG. 3), which preferably form a coaxial cable 46. The detected pressure shock wave applied onto the quartz crystal 36 becomes faithfully converted by the probe 30 into a corresponding current wave at the output of amplifier 42, which appears on cable 46.

Cable 46, which applies current to amplifier 42 as well as transmits the detected current wave from the amplifier, passes through end cap 18. The remote end of cable 46 is A-C coupled to a recording device 49 on the deck of the seismic vessel.

The separation between the detector assembly 10 and the recording device normally is on the order of 250 feet. Accordingly, if the pressure transducer assembly 10 of this invention was not acting as a current source, variations in the resistance of the long cable 46 might create corresponding variations in the detected electric signals, thereby introducing substantial errors and precluding the detector probe from faithfully reproducing the incoming shock waves.

Housing 31 of the detector probe 30 is mounted inside and extends on both sides of a center bore 51 in an annular bushing 50 (FIG. 1) which is positioned approximately midway between end caps 18 and 20. Bushing 50 is secured to wall 14 by an external clamp 54. Between the opposite flat walls of bushing 50 extend a plurality of longitudinal bores 56 which allow fluid communication between, and hence equal pressure in, the two half sections of chamber 16 separated by the bushing 50.

The transducer assembly 10 is detachably coupled by tape bands 56 to a known seismic gun 58, such as is used in the MAXIPULSE SYSTEM, having an acceleration barrel 60 and a firing head 62. Gun 58 is adapted to percussion initiate a small seismic cartridge 64 and to eject it into the surrounding body of water 66. Each explosively-operated cartridge 64 is delivered to gun 62 by a stream of water flowing through a flexible conduit 68 and is percussion initiated by a percussion member 70 and ejected through a lateral open window 72.

Cartridge 64 includes a delay fuse to allow the seismic boat to tow away gun 58 by a predetermined distance, typically 6 feet, from the initiated and ejected charge 64.

When at a safe distance the charge explodes and forms a rapidly expanding volume of gas confined to a bubble 74. Because this gas bubble is normally generated at a depth of say 30 to 50 feet, it cannot vent directly to the atmosphere and, therefore, undergoes a very fast initial expansion, as indicated by the outwardly-directed arrows, which causes the surrounding water to suddenly become strongly compressed, thereby creating a shock wave. Subsequent to the initial expansion, the bubble contracts to 75, as indicated by the inwardly-directed arrows, then again expands to 76, then again contracts to 77, etc.

The entire sequence of such gas bubble expansions and contractions forms a high-pressure wave in the body of water. It is the object of detector assembly 10 to faithfully convert the unreflected, high-pressure wave into a corresponding current wave from which the amplitude of each pressure pulse and its time of occurrence can be determined.

The high-pressure wave will of course propagate through the water, reach the sea floor, traverse through the underlying earth formations, become reflected therefrom and return back as low-energy, reflected, acoustic pressure waves into the body of water. The reflected seismic acoustic waves are detected in a conventional manner by a streamer cable 80 also towed by the seismic boat.

As previously mentioned, said U.S. Pat. No. 3,592,286 describes a method for practicing the MAXIPULSE SYSTEM by correlating the detected reflected seismic waves by cable 80 with the unreflected pressure waves detected by detector assembly 10 of this invention.

Should an undesired premature explosion take place, the previously mentioned safe distance of about 6 feet may be reduced to one foot and consequently the resulting shock wave may overdrive the first detector probe, thereby resulting in an unfaithful reproduction of the shock wave. There is therefore provided a second detector assembly 10′ separated from the first detector assembly 10 by a distance of say 5 to 7 feet. The second detector assembly 10′ is in all respects identical to the first detector assembly 10 and its corresponding parts will have the same numerals but primed to indicate the analogy. Thus, when the output of the first detector assembly 10 is overdriven by a premature explosion or is otherwise defective, the output of the second detector assembly 10′ appearing on cable 46′, after being recorded by recorder 49, can be used to carry out the process of said U.S. Pat. No. 3,592,286.

While this invention has been described in connection with preferred embodiments thereof, it will be appreciated that modifications may be made therein without departing from the scope of the claims attached hereto:

What is claimed is:

1. A method of marine seismic prospecting comprising the steps of:

establishing a bubble containing a high-pressure expanding volume of gas at a sufficient depth to prevent the gas from directly venting to the atmosphere;

the initial expansion of said gas bubble generating in the water a desired initial acoustic impulse for subsequent reflection from the sub-bottom strata;

said gas bubble subsequent to said initial expansion collapsing and again expanding to create in the water at least a first bubble acoustic impulse which also becomes reflected from said sub-bottom strata;

detecting the reflected signals from said initial impulse and said first impulse; and detecting the unreflected acoustic impulses with at least one pressure detector assembly, said detector assembly comprising:
   (a) a housing having a flexible, pressure-transmitting wall defining a chamber;
   (b) a substantially incompressible dielectric liquid completely filling said chamber,
   (c) a detector probe completely immersed in said liquid, said probe comprising: a metallic housing, a quartz crystal mounted on an inner wall portion of said housing, an amplifier in said housing, and circuit means coupling said quartz crystal to the input circuit of said amplifier; and recording at a remote location the output signals from said amplifier, said output signals representing said unreflected acoustic impulses.

2. The method of claim 1 and from a remote location feeding current to said amplifier to energize same.

* * * * *